(12) United States Patent
Araki

(10) Patent No.: US 8,009,179 B2
(45) Date of Patent: Aug. 30, 2011

(54) CONTENT BROWSING SYSTEM, CONTENT BROWSING METHOD, AND COMPUTER PROGRAM PRODUCT

(75) Inventor: Tadashi Araki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 791 days.

(21) Appl. No.: 11/822,552

(22) Filed: Jul. 6, 2007

(65) Prior Publication Data

US 2008/0018670 A1    Jan. 24, 2008

(30) Foreign Application Priority Data

Jul. 18, 2006 (JP) ................................. 2006-196206

(51) Int. Cl.
*G09G 5/22* (2006.01)

(52) U.S. Cl. .................................... 345/660; 715/788

(58) Field of Classification Search .................. 345/660; 715/788
See application file for complete search history.

(56) References Cited

U.S. PATENT DOCUMENTS

| | | | | |
|---|---|---|---|---|
| 6,493,702 | B1* | 12/2002 | Adar et al. ..................... | 707/706 |
| 2002/0089549 | A1* | 7/2002 | Munro et al. ................. | 345/835 |
| 2003/0063094 | A1* | 4/2003 | Smith ........................... | 345/581 |
| 2003/0132944 | A1* | 7/2003 | Smith ........................... | 345/581 |
| 2004/0006457 | A1* | 1/2004 | Dehlinger et al. ................ | 704/5 |
| 2005/0195221 | A1* | 9/2005 | Berger et al. ................. | 345/660 |
| 2006/0123360 | A1* | 6/2006 | Anwar et al. .................. | 715/810 |
| 2006/0149708 | A1* | 7/2006 | Lavine .............................. | 707/3 |
| 2006/0187240 | A1* | 8/2006 | Araki et al. ................... | 345/660 |
| 2007/0011316 | A1* | 1/2007 | Araki et al. ................... | 709/224 |
| 2007/0100898 | A1* | 5/2007 | Petras et al. .................. | 707/200 |
| 2008/0148144 | A1* | 6/2008 | Tatsumi ......................... | 715/235 |
| 2009/0089264 | A1* | 4/2009 | Lavine .............................. | 707/3 |
| 2010/0198834 | A1* | 8/2010 | Petras et al. .................. | 707/741 |

FOREIGN PATENT DOCUMENTS

| | | |
|---|---|---|
| CN | 1825310 A | 8/2006 |
| JP | 2006-048151 | 2/2006 |
| JP | 2006-228142 | 8/2006 |
| JP | 2006-277337 | 10/2006 |
| JP | 2006-323528 | 11/2006 |
| JP | 2007-018343 | 1/2007 |
| JP | 2007-025786 | 2/2007 |
| JP | 2007-034960 | 2/2007 |
| JP | 2007-034961 | 2/2007 |
| JP | 2007-133760 | 5/2007 |
| JP | 2007-133761 | 5/2007 |

OTHER PUBLICATIONS

Perlin, K. and Fox, D. Pad: An Alternative Approach to the Computer Interface, Proceedings of SIGGRAPH'93, 1993, pp. 57-64.
Bederson, B.B. and Hollan, J.D.: Pad++: A Zooming Graphical Interface for Exploring Alternate Interface Physics, Proceedings of UIST '94, 1994, pp. 17-26.

(Continued)

*Primary Examiner* — Javid Amini
(74) *Attorney, Agent, or Firm* — Dickstein Shapiro LLP

(57) ABSTRACT

A content browsing system changes a display state of a content that includes an object or the object according to zoom operation of a user, and includes an evaluation information storage unit and a display controlling unit. The evaluation information storage unit stores therein evaluation information related to the content or the object. The display controlling unit controls the display state of the content or the object selected as a zoom target based on the evaluation information.

18 Claims, 11 Drawing Sheets

OTHER PUBLICATIONS

Bederson, B.B., Meyer, J. and Good, L.: Jazz: An Extensible Zoomable User Interface Graphics Toolkit in Java, Proceedings of UIST '00, 2000, pp. 171-180.

Holmquista, L.E. and Ahlbergb, C.: Flip Zooming: A Practical Focus+Context Approach to Visualizing Large Data Sets, Proc. HCI International '97, 1997, pp. 763-766.

Woodruff, A., Landai, J. and Stonebraker, M.: Goal-Directed Zoom, Proceedings of CHI '98, pp. 305-306.

Sarkar, M., Snibbe, S.S., Tversky, O.J. and Reiss, S.P., M.: Stretching the Rubber Sheet: A Metaphor for Viewing Large Layouts on Small Screens, Proceedings of UIST '93, 1993, pp. 81-91.

lgarashi, T and Hinckley, K.: Speed-dependent Automatic Zooming for Efficient Document Navigation, WISS 2000.

Lam, Heidi et al., "Musicland: Exploratory Browsing in Music Space", INFOVIS 2005, Oct. 23-25, 2005, Minneapolis, MN, USA, pp. 1-2.

Heer, Jeffrey et al., "DOITrees Revisited: Scalable, Space-Constrained Visualization of Hierarchical Data", Proceedings of the Working Conference on Advanced Visual Interfaces, May 25-28, 2004, Gallipoli, Italy, pp. 421-424.

lgarashi, Takeo et al., "Speed-Dependant Automatic Zooming for Browsing Large Documents", Proceedings of the 13th Annual ACM Symposium on User Interface Software and Technology, Nov. 5-8, 2000, San Diego, CA, USA, pp. 139-148.

\* cited by examiner

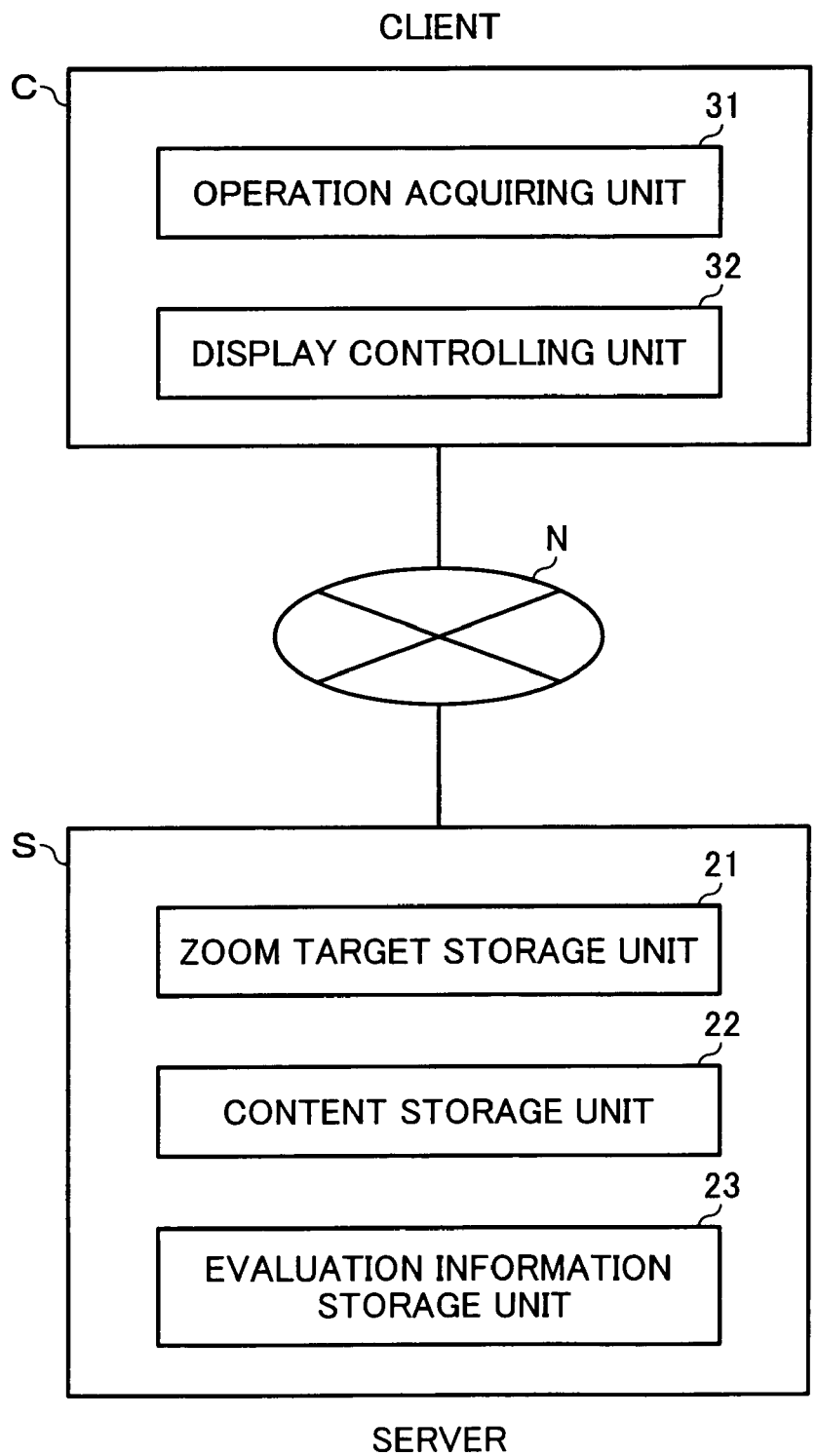

FIG. 4

| LITERATURE NAME | RANKING SCORE | POPULARITY LEVEL | DIFFICULTY LEVEL | PUBLICATION YEAR |
|---|---|---|---|---|
| LITERATURE A | 0.55 | 3.4 | 4.0 | 1997 |
| LITERATURE B | 0.37 | 4.5 | 3.7 | 2003 |
| LITERATURE C | 0.86 | 3.8 | 3.2 | 2001 |
| LITERATURE D | 0.62 | 2.6 | 4.6 | 1994 |
| LITERATURE E | 0.29 | 3.3 | 2.5 | 2005 |
| LITERATURE F | 0.71 | 2.1 | 3.9 | 1998 |

LITERATURE C: TITLE
LITERATURE F: TITLE
LITERATURE D: TITLE
LITERATURE A: TITLE
LITERATURE B: TITLE
LITERATURE E: TITLE (b)

LITERATURE C: TITLE
LITERATURE F: TITLE
LITERATURE D: TITLE
LITERATURE A: TITLE
LITERATURE B: TITLE
      AUTHOR
LITERATURE E: TITLE (c)

LITERATURE C: TITLE
      AUTHOR
LITERATURE F: TITLE
LITERATURE D: TITLE
LITERATURE A: TITLE
      AUTHOR
LITERATURE B: TITLE
      AUTHOR
      PUBLISHER

LITERATURE E: TITLE
      AUTHOR

ZOOM-IN →

← ZOOM-OUT

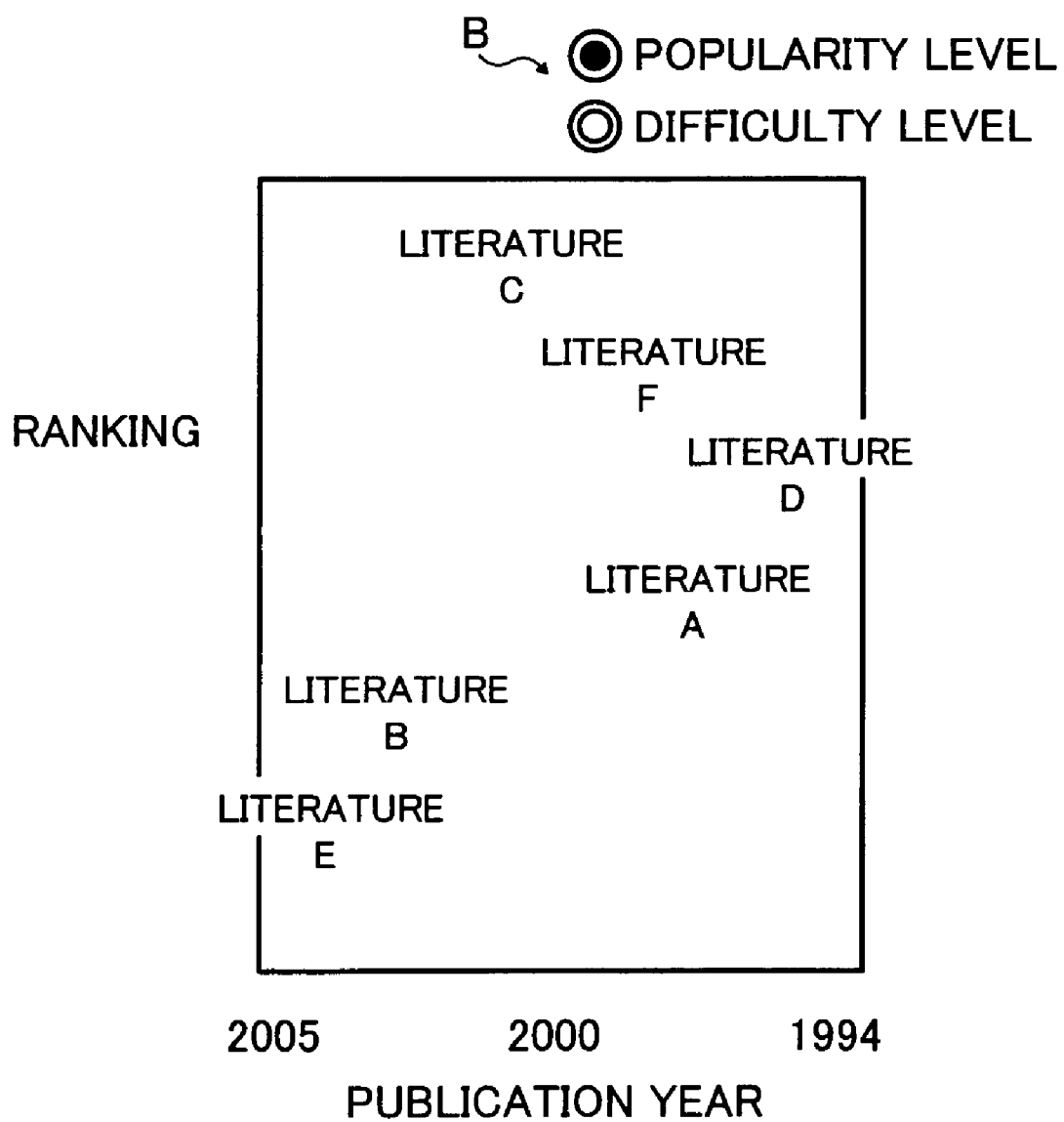

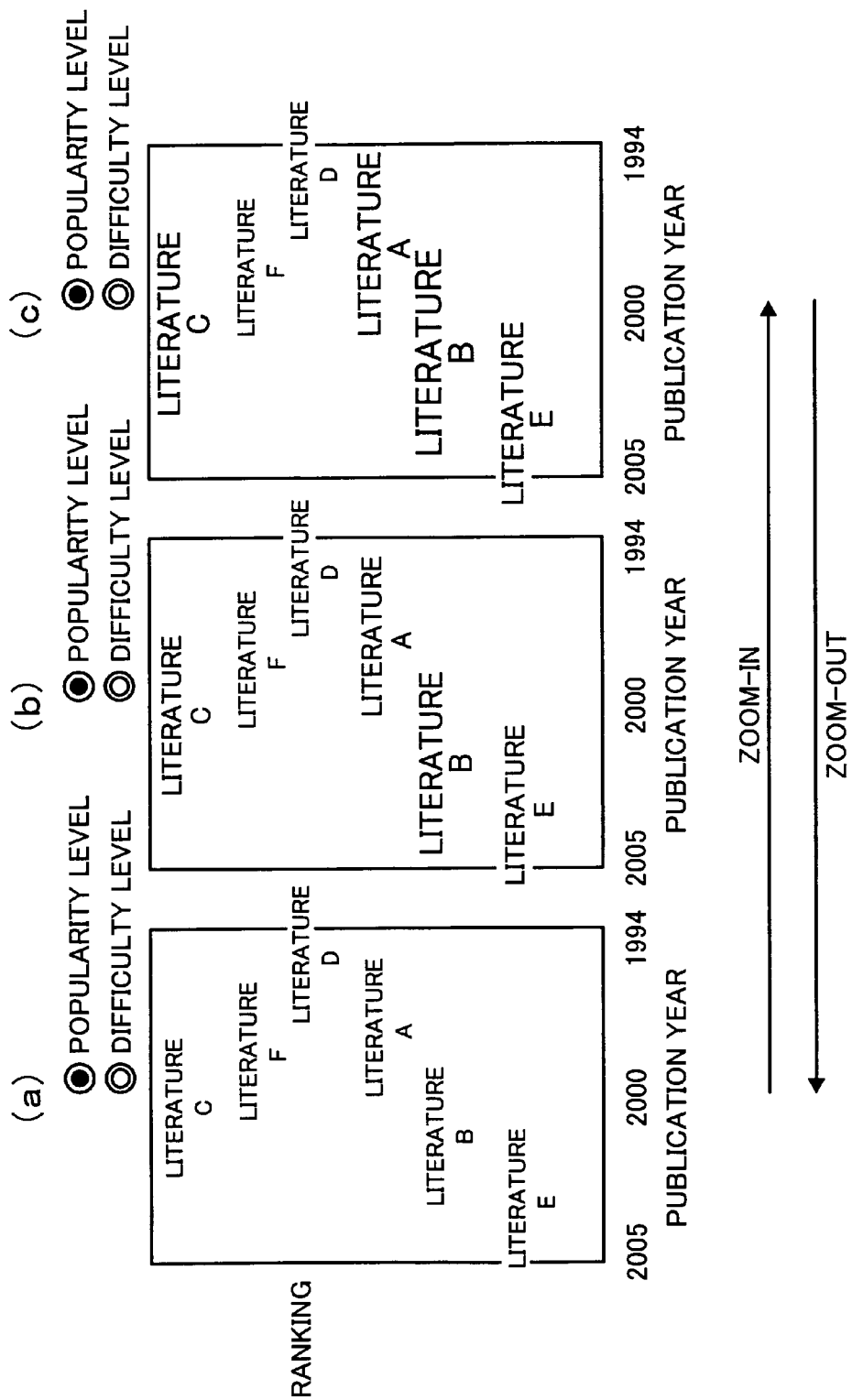

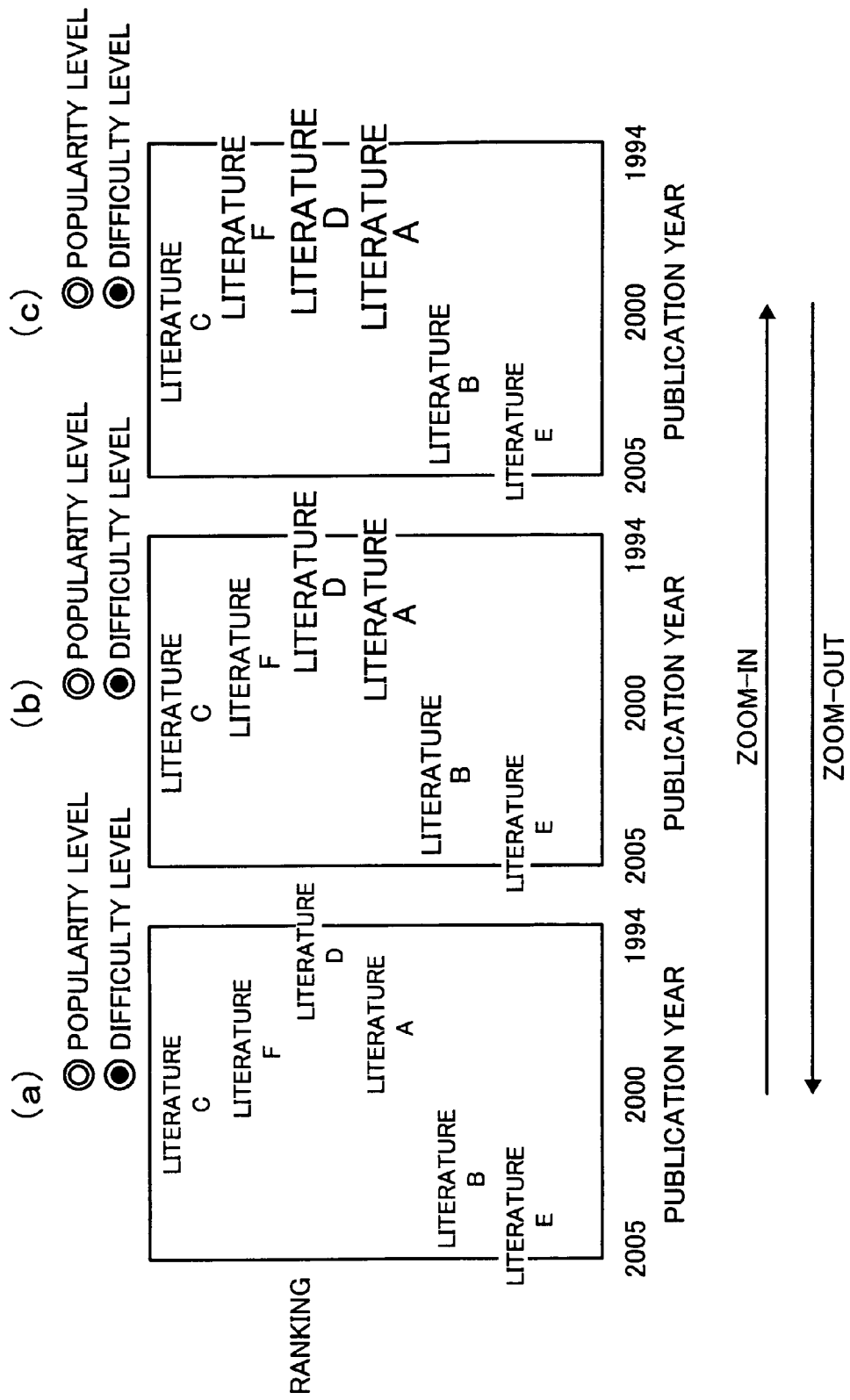

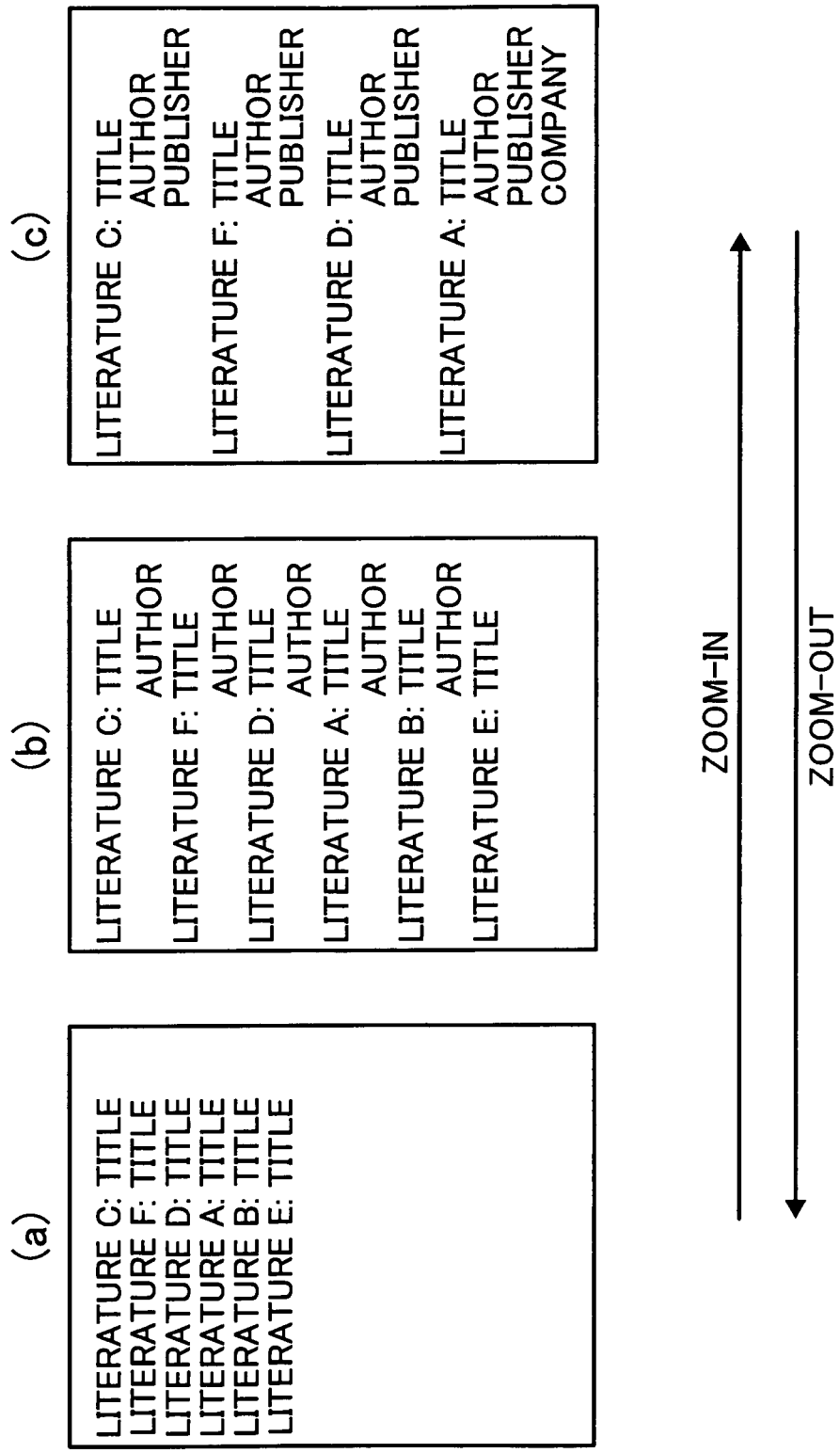

CONTENT BROWSING SYSTEM, CONTENT BROWSING METHOD, AND COMPUTER PROGRAM PRODUCT

CROSS-REFERENCE TO RELATED APPLICATIONS

The present document incorporates by reference the entire contents of Japanese priority document, 2006-196206 filed in Japan on Jul. 18, 2006.

BACKGROUND OF THE INVENTION

1. Field of the Invention

The present invention relates to a content browsing system, a content browsing method, and computer program product.

2. Description of the Related Art

Nowadays, with widespread use of mobile phones with camera, digital video cameras or the like, improvement in performance of personal computers, and increase in network speed, it has become common to capture multimedia information, such as audio, and a still image and a moving image except for text, in a personal computer (PC) to utilize, transmit and receive, and share the multimedia information on a Web environment. The amount of such multimedia information is increasing on the Web environment. To utilize a vast amount of multimedia information on networks effectively, it is important that a user can browse information (content) according to his/her utilization purpose efficiently. Preferably, the user can control an amount of information to be displayed or the type of media to be utilized according to browsing state or his/her preference.

Web browsing requires easy access to desired information. Therefore, it is important that a relationship between an outline of the entire content and details of the content is easily understandable. For example, if content of individual items can be simultaneously browsed in a screen of a list of search results, improvement in search efficiency can be expected.

It is also required that information is displayed flexibly in a form suitable for user's purpose, preference, and browsing state. For example, in the case of browsing a report about business trip, a boss of a reporter is likely to wish to view an agenda for a meeting on the business trip, and an accountant is likely to wish to view utilized transportations and transportation expenses. It is also likely that detailed text information with images is desired on a desktop PC, while an outline of the information is desired on a mobile terminal. Therefore, it is desirable that a user can control an amount of text, a size of an image, balance between the both, or the like flexibly.

On the other hand, fundamental operation interfaces in a current Web environment include scrolling and anchor clicking. By utilizing these operations properly, a user can perform browsing while displaying large (broad area) content on a screen, or while moving from one page to another among hyperlinked related pages by anchor clicking. Thus, browsing efficiency is enhanced.

However, viewability is reduced with an increase in amount of information to be displayed on a single page even if scrolling is utilized. When one page is divided into pieces and they are linked, a user jumps to another page to browse a linked page, and therefore, context of browsing is lost. A number of jumps between links not only makes it difficult to return to an original page but also makes it difficult to find positioning of a portion on which attention is currently focused in the entire context.

As described above, it is difficult to control a display form flexibly according to user's purpose, preference, and browsing state in the current Web environment. It is necessary to preliminarily assume display forms and prepare a plurality of pages corresponding to the display forms to realize such flexible control in the general Web environment, which results in complicated page structure.

In recent years, a zooming user interface (ZUI) that is an operation interface for controlling the level of detail of what is displayed on a screen continuously has been researched and developed variously.

There has been proposed a conventional technology, in which, when one of respective pages or images arranged two-dimensionally is selected and zoomed, only the page or image is displayed largely while a peripheral display remains unchanged. Reference may be had to, for example, Perlin, K. and Fox, D.: Pad: "An alternative approach to the computer interference," Proceedings of SIGGRAPH'93, pp. 57-64 (1993), Bederson, B. B. and Hollan, J. D.: Pad++: "A Zooming Graphical Interface for Exploring Alternate Interface Physics," Proceedings of UIST'94, pp. 17-26 (1994), and Bederson, B. B., Meyer, J. and Good, L.: Jazz: "An Extensible Zoomable User Interface Graphics Toolkit in Java," Proceedings of UIST'00, pp. 171-180 (2000).

There has been proposed another conventional technology, in which candidates of display formats for an object to be handled are presented on a menu and the object is zoomed automatically in such an extent that it can be displayed with a proper level of detail by a display format selected by a user. Reference may be had to, for example, Holmquista, L. E. and Ahlbergb, C.: Flip Zooming: "A Practical Focus+Context Approach to Visualizing Large Data Sets," Proc. HCI International'97, pp. 763-766 (1997), and Woodruff, A., Landay, J. and Stonebraker, M.: "Goal-Directed Zoom," Proceedings of CHI'98, pp. 305-306 (1998).

Besides, there has been proposed still another conventional technology related to zooming from a plurality of viewpoints. Reference may be had to, for example, Sarkar, M., Snibbe, S. S., Tversky, O. J., and Reiss, S. P., M.: Stretching the Rubber Sheet: "A Metaphor for Viewing Large Layouts on Small Screens," Proceedings of UIST'93, pp. 81-91 (1993).

There has been proposed still another conventional technology related to zooming in response to a moving speed of a mouse cursor. Reference may be had to, for example, Igarashi, T and Hinckley, K.: "Speed-dependent Automatic Zooming for Efficient Document Navigation," WISS 2000, pages (2000).

According to these technologies, an overview and enlarged detail can be displayed together in one page, which contributes to improvement in browsing efficiency.

However, these technologies have been fundamentally developed based upon intention to provide an application for displaying content with a zooming function. For example, for realizing such a configuration that, when upper text in meaning is zoomed in, lower detailed text appears, or display balance between text and an image associated with each other is controlled in a linking manner, a behavior program including information about the structure of content to be subjected to zooming operation has to be incorporated into an application in advance. Therefore, it is generally impossible to zoom any content except for content having a structure that is assumed for the application. Accordingly, these technologies are improper for performing the zooming operation versatilely on a Web environment where there are contents having various structures.

The applicant has proposed, in Japanese Patent Application No. 2005-044515, another conventional technology in which zooming is applied to content that contains various objects to continuously change a display state of the objects. According to the conventional technology, a media object such as text, still image, moving image, and sound is taken as a target to be subjected to zoom operation, and a font size, an image size, reproduction time, etc., are continuously controlled according to the zoom operation. Thus, it is possible to perform the zoom operation for the entire content or for each of the objects that constitute the content.

However, the above conventional technology still has room for improvement.

FIG. 4 is an example of evaluation information, such as ranking score, popularity level, difficulty level, and publication year, of literatures retrieved from a library using a certain search keyword. The ranking score is, for example, a value indicating a degree of relevance between a search keyword and literature summary. The ranking score is calculated by a method such as Tf/Idf, and is assumed to be a value from 0.0 to 1.0. The popularity level can be automatically calculated based on lending times of literatures, evaluation values determined by library users or librarians, or any combination thereof. The difficulty level is calculated based on the evaluation values determined by users and librarians. The difficulty level is assumed to be a value from 1.0 to 5.0. That is, the ranking score, the popularity level and the difficulty level can be defined as evaluation information.

FIG. 12 is an example of results obtained by conventional zoom-in/zoom-out operation for all search results. In (a) of FIG. 12, a search result screen displays, as the search results, a list of only the titles of the literatures arranged in descending order of the ranking score shown in FIG. 4. If zooming (zoom-in operation) is performed for the entire list of the search results, information items other than the title such as author and publisher appear as shown in (b) and (c) of FIG. 12.

That is, in the conventional technology, all literatures are evenly zoomed regardless of the evaluation values as shown in FIG. 12, and evaluation information other than a predetermined evaluation value (ranking score in FIG. 12) cannot be acquired.

SUMMARY OF THE INVENTION

It is an object of the present invention to at least partially solve the problems in the conventional technology.

According to an aspect of the present invention, a content browsing system that performs zoom operation for a content that includes an object or the object to change a display state of the content or the object, includes a storage unit that stores therein evaluation information including an evaluation value related to the content or the object, and a display control unit that controls the display state of the content or the object selected as a zoom target based on the evaluation information.

According to another aspect of the present invention, a content browsing method for performing zoom operation for a content that includes an object or the object to change a display state of the content or the object, includes storing evaluation information including an evaluation value related to the content or the object, and controlling the display state of the content or the object selected as a zoom target based on the evaluation information.

According to still another aspect of the present invention, a computer program product includes a computer program that implements the above methods on a computer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a functional block diagram of a server and a client shown in FIG. 1;

FIG. 4 is an example of evaluation information of literatures retrieved using a search keyword;

FIGS. 5 to 8 are examples of results obtained by zoom-in/zoom-out operation for all search results;

FIG. 9 is an example of a search result screen according to a second embodiment of the present invention;

FIGS. 10 and 11 are examples of results obtained by zoom-in/zoom-out operation for all search results; and FIG. 12 is an example of results obtained by conventional zoom-in/zoom-out operation for all search results.

DETAILED DESCRIPTION OF THE PREFERRED EMBODIMENTS

Exemplary embodiments of the present invention are explained in detail below with reference to the accompanying drawings.

Figure 1:
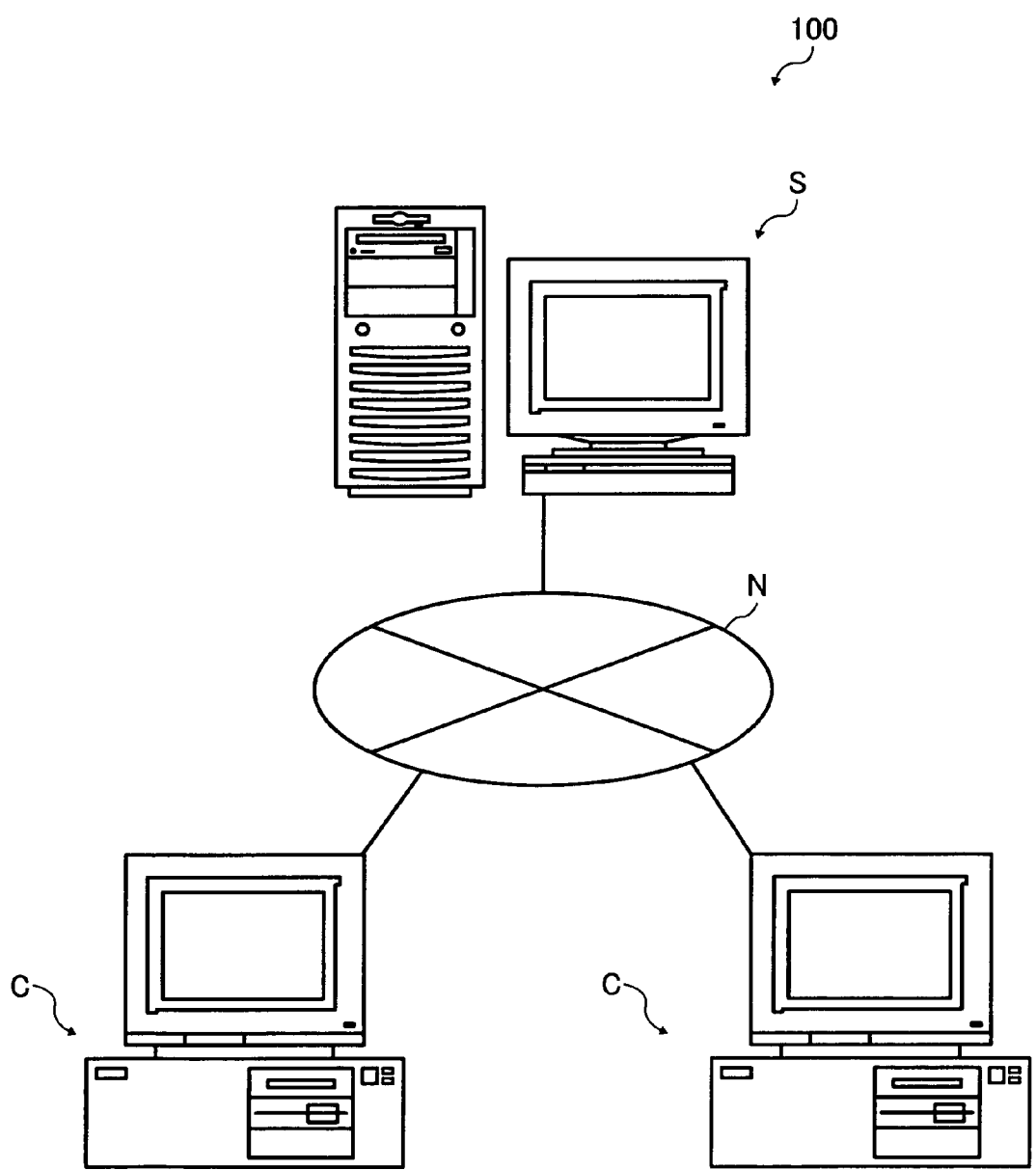
FIG. 1 is a schematic diagram of a content browsing system according to an embodiment of the present invention.

FIG. 1 is a schematic diagram of a content browsing system 100 according to a first embodiment of the present invention. The content browsing system 100 is a server-client system that includes a server (content server) S, and a plurality of clients C connected to the server S via a network N such as a Local Area Network (LAN). The server S is a computer for providing services to the clients C. The clients C are computers that users operate to receive the services. The server S and the client C are general personal computers.

Figure 2:
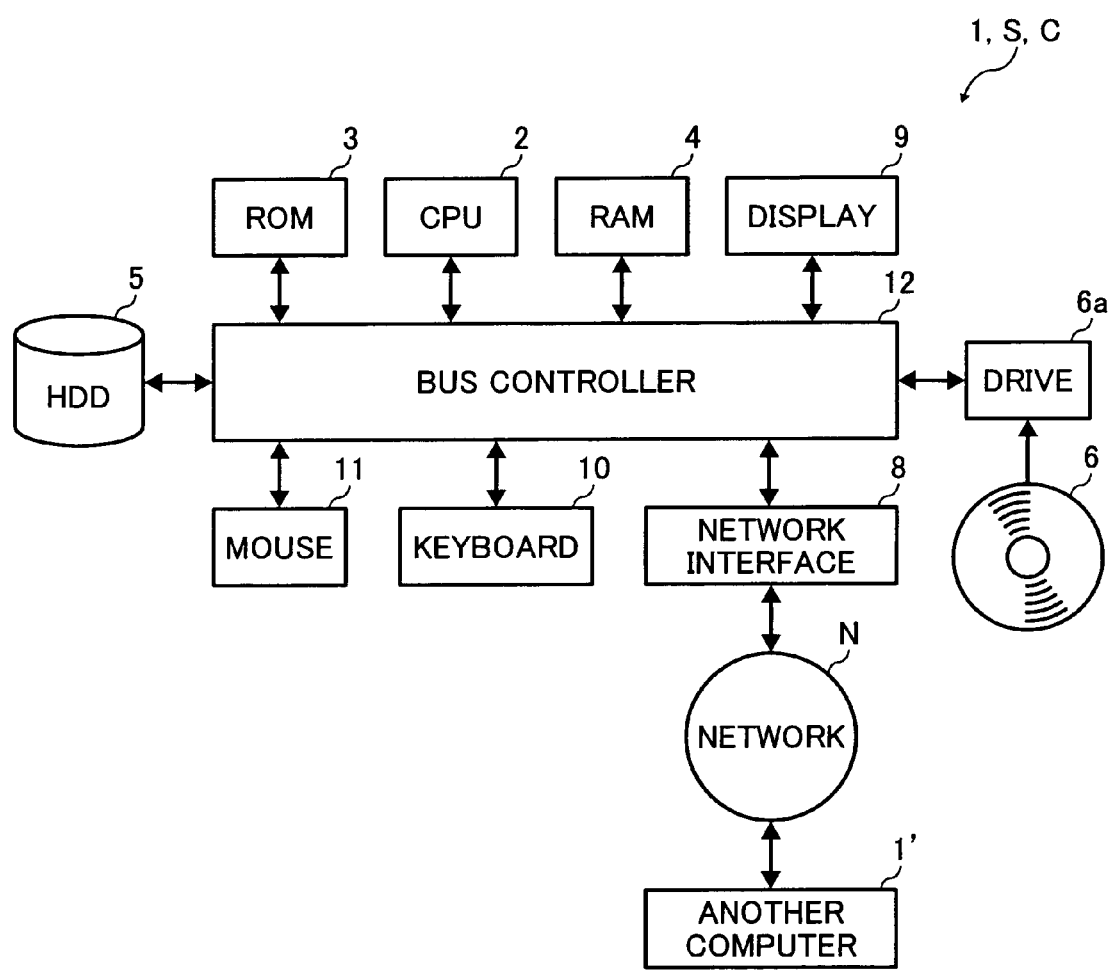
FIG. 2 is a block diagram of a hardware configuration of a personal computer shown in FIG. 1.

FIG. 2 is a block diagram of a hardware configuration of a personal computer 1. The personal computer (hereinafter, "computer") 1 includes a Central Processing Unit (CPU) 2, a Read Only Memory (ROM) 3, a Random Access Memory (RAM) 4, a Hard Disk Drive (HDD) 5, a drive 6a, a network interface 8, a display 9, a keyboard 10, a mouse 11, and a bus controller 12.

The CPU 2 performs data processing. The ROM 3 stores therein a basic input/output system (BIOS) and the like. The RAM 4 is a primary storage device that temporarily stores information during processing. The HDD 5 is a secondary storage device that stores therein an application program, a processing result, and the like. The drive 6a for a removable medium 6 that is a storage medium for externally storing, distributing, or acquiring information (an application program and the like). The network interface 8 is connected to a network N for communicating with external other computers 1'. The display 9 displays a processing progress, a processing result, and the like for a user. The keyboard 10 and the mouse 11 each are an input unit through which a user provides input such as a command and information to the computer 1. The bus controller 12 controls data communication among these units.

Examples of the removable medium 6 include a magnetic storage medium such as a flexible disk, a hard disk and a magnetic tape, a magneto-optical storage medium such as a magneto optical disk (MO), an optical storage medium such as a compact disc (CD), a compact disc-read only memory (CD-ROM), a compact disc-recordable (CD-R), a compact disc-read only memory (CD-RW), a digital video disc-read only memory (DVD-ROM), a digital video disc-recordable (DVD-R), a digital video disc-random access memory (DVD-RAM), a digital video disc-rewritable (DVD-RW) and DVD+RW, and a semiconductor memory.

In data communication, upon receiving data to be transmitted, the network interface 8 outputs a signal to the network N. Upon receiving a signal of data via the network N, the network interface 8 determines whether the data is necessary, and discards unnecessary data. That is, transmission and reception of any data are performed via the network interface 8.

Generally, when a user turns on the computer 1, the CPU 2 starts a computer program "loader" in the BIOS in the ROM 3. The CPU 2 also loads a computer program "operating system (OS)" for managing hardware and software of the computer 1 from the HDD 5 into the RAM 4. When the OS starts, it supports start of application programs, reading of information, storing thereof, and the like according to user's operation. Examples of known OS include Windows (registered trademark of Microsoft Corporation), and UNIX (registered trademark of X/Open, Inc.). A computer program running on the OS is hereinafter referred to as "application program". The application program is not limited to one operating on such a predetermined OS. The application program can be one causing OS to perform part of various processes described later, or can be included as a portion of a group of program files configuring predetermined application software, an OS, or the like.

An application program installed in the HDD 5 of the computer 1 is recorded on the removable medium 6, and the application program recorded on the removable medium 6 is installed on the HDD 5. Therefore, the removable medium 6 can also be a recording medium for storing the application program. The application program can be downloaded from the outside via the network interface 8 into the HDD 5.

In the computer 1 (the server S and the client C), when the application program running on the OS starts, the CPU 2 performs various operations to control the respective units.

Next, characteristic operations performed by the CPU 2 are explained. Briefly speaking, the first embodiment is characterized in that, when zoom-in is performed on an initial screen showing only text in multimedia content (reports, proceedings, notes, or the like), more detailed text information, such as photographs of conference participants, moving images of discussion, and sound of the discussion, can be browsed.

The server S (the computer 1) stores a content display program in the HDD 5 as an application program. That is, in the sever S, when the content display program running on the OS starts, the CPU 2 controls the respective units to perform content display processing according to the content display program.

On the other hand, the client C (the computer 1) stores a content browsing program in the HDD 5 as an application program. That is, in the client C, when the content browsing program running on the OS starts, the CPU 2 controls the respective units to perform content browsing processing according to the content browsing program.

FIG. 3 is a functional block diagram of the server S and the client C. As shown in FIG. 3, in the server S, the CPU 2 operates according to a content displaying program running on the OS to realize a zoom target storage unit 21, a content storage unit 22, and an evaluation information storage unit 23. On the other hand, in the client C, the CPU 2 operates according to a content browsing program running on the OS to realize an operation acquiring unit 31 and a display controlling unit 32.

First, the content display processing performed by the server S is explained.

The zoom target storage unit 21 stores media objects (text, still image, moving image, audio, and the like) in, for example, the HDD 5. The media objects constitute a multimedia content that represents the content of information, and each can be a zoom target. That is, the media objects are units of zooming operation.

The content storage unit 22 stores information on a content configuration and a zoom behavior, for example, in the HDD 5. For example, the content configuration is written in Hyper-Text Markup Language (HTML), and the zoom behavior is written in Java Script (registered trademark).

The evaluation information storage unit 23 stores therein evaluation information representing various evaluations related to the entire content or the objects. FIG. 4 is an example of the evaluation information, such as ranking score, popularity level, difficulty level, and publication year, of literatures retrieved from a library using a certain search keyword. In this case, all search results correspond to the entire content and a literature corresponds to an object. The ranking score is, for example, a value indicating a degree of relevance between a search keyword and literature summary. The ranking score is calculated by a method such as Tf/Idf, and is assumed to be a value from 0.0 to 1.0. The popularity level can be automatically calculated based on lending times of literatures, evaluation values determined by library users or librarians, or any combination thereof. The difficulty level is calculated based on the evaluation values determined by users and librarians. The difficulty level is assumed to be a value from 1.0 to 5.0. The evaluation information (ranking score, popularity level, difficulty level, and publication year) is stored in the evaluation information storage unit 23.

The following is a discussion on the browsing operation and content behavior in a web environment and intention of a content creator. With regard to scroll operation, opportunities and necessities are few for the content creator to reflect his/her intention, and a user mainly performs scrolling dependent on a viewer size. On the other hand, with regard to anchor click, while the content creator specifies a target to be clicked (anchor represented by a character string, an image, etc.) and a linked Uniform Resource Locator (URL) with a clear intention, a dynamic behavior is not necessarily be written.

The following is a discussion on the zoom operation. Although the zoom operation does not require particular items to be specified by the creator if the entire content screen is simply zoomed in/out, the content creator has to explicitly and intentionally specify a target that is to be subjected to the zoom operation, the detailed degree according to the zoom operation, and how displayed media are changed to realize a finely-tuned zoom operation.

Next, the content browsing processing in the client C is explained.

The operation acquiring unit 31 acquires operation content of a user. The operation acquiring unit 31 acquires such operation as dragging of a mouse cursor for zooming operation after an object to be zoomed is designated. When, for example, the mouse cursor is dragged downward on a display screen, the object is to be zoomed in, while the mouse cursor is dragged upward, the object is to be zoomed out.

The display controlling unit 32 reads a zoom-target media object (text, still image, moving image, and sound) stored in the HDD 5, etc. by the zoom target storage unit 21. The display controlling unit 32 controls the settings of display/non-display and detailed degree of the media object on the display 9, the automatic setting of media-object display position, displaying of a frame surrounding the media object based on user's operation acquired from the operation acquiring unit 31, the content configuration and the zoom behavior stored in the HDD 5, etc. by the content storage unit 22, and the evaluation information stored in the evaluation information storage unit 23. Specifically, the display controlling unit 32 provides zoom display based on the content configuration and the zoom behavior stored in the content storage unit 22 and the evaluation information stored in the evaluation information storage unit 23 to set display/non-display and detailed degree of the media object on the display 9.

As the operation acquiring unit 31 and the display controlling unit 32, a Web browser can be used.

The zooming operation realized by the operation acquiring unit 31 and the display controlling unit 32 is described below.

FIG. 5 is an example of results obtained by zoom-in/zoom-out operation for all search results. In (a) of FIG. 5, a search result screen displays, as the search results, a list of only the titles of the literatures arranged in descending order of the ranking score shown in FIG. 4. If zooming (zoom-in operation) is performed for the entire list of the search results, information items other than the title such as author and publisher appear as shown in (b) and (c) of FIG. 5. Specifically, a zoom target is selected by clicking it with the mouse 11, and a wheel of the mouse 11 is rotated in a predetermined direction for zoom-in and toward a direction opposite thereto for zoom-out. The zoom-in on the search result screen shown in (a) of FIG. 5 results in the state shown in (b) of FIG. 5. The zoom-in on the search result screen shown in (b) of FIG. 5 results in the state shown in (c) of FIG. 5. The states are reversed in the case of zoom-out.

In FIG. 5, the display controlling unit 32 controls the zoom display of each literature based on the popularity level stored as the evaluation information in the evaluation information storage unit 23. Specifically, literatures are roughly categorized into three types: literatures with a popularity level of 4.0 or more, literatures with a popularity level of 3.0 or more and 4.0 or less, and of 3.0 or less. A literature with a higher popularity level is accompanied by more information items.

That is, if the zoom-display state of the entire content or the objects is associated with the number of information items related to the entire content or the objects, the number of information items is changed according to an evaluation value to control the zoom display of the entire content or the objects.

Specifically, if the zoom-display state of the entire content or the objects is associated with the number of information items related to the entire content or the objects, more information items are displayed when an evaluation value is higher, or less information items are displayed when an evaluation value is higher.

Although the display controlling unit 32 performs the display control while referring to the evaluation information as shown in FIG. 4 at the time of the zoom operation in the first embodiment, this is not a limitation. For example, details of a zoom behavior can be preliminarily determined based on the evaluation information and stored in the content storage unit 22.

Figure 6:
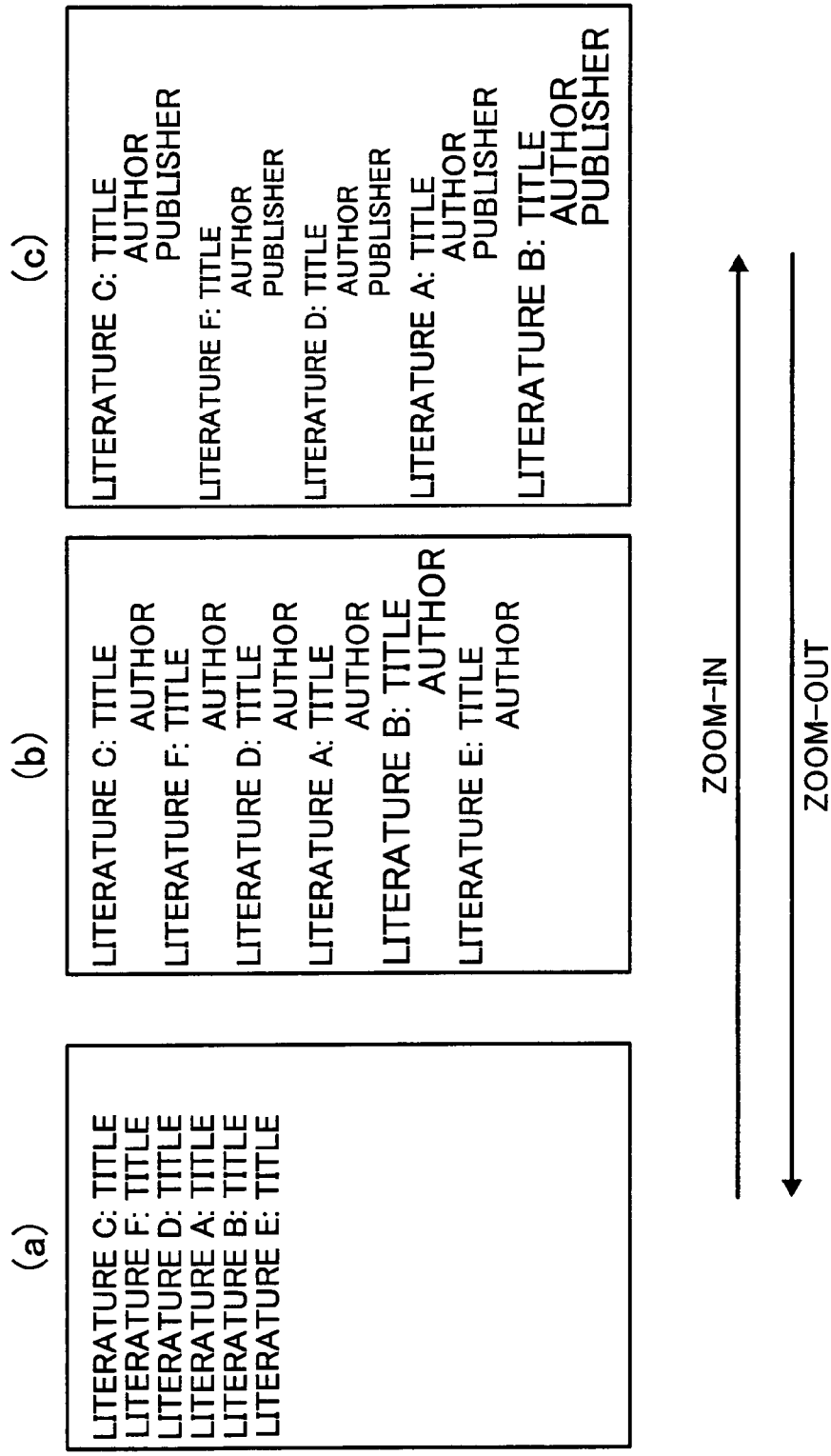

FIG. 6 is an example of results obtained by the display controlling unit 32 controlling the search results based on the popularity level stored as the evaluation information in the evaluation information storage unit 23. In FIG. 6, a literature with a higher popularity level is displayed in a larger font size. The font size is not always increased as a result of zoom-in, and the font size is reduced for the literatures (literature F and literature D) at the popularity level of 3.0 or less.

That is, if the zoom-display state of the entire content or the objects is associated with the font size of text included in the entire content or the objects, the font size is changed according to an evaluation value to control the zoom display of the entire content or the objects.

Specifically, if the zoom-display state of the entire content or the objects is associated with the font size of text included in the entire content or the objects, the font size is increased when an evaluation value is higher, or the font size is decreased when an evaluation value is higher.

Figure 7:
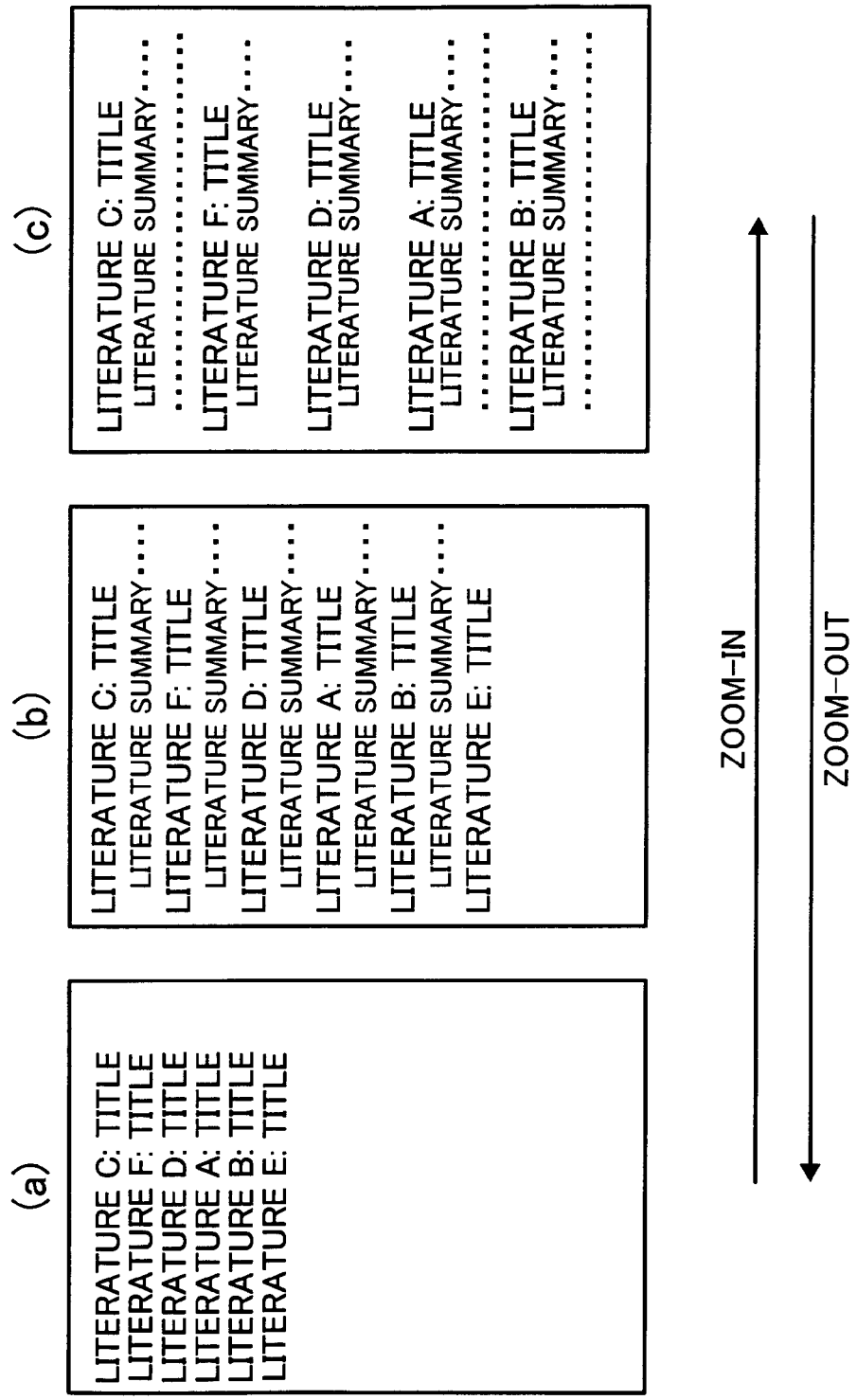

FIG. 7 is another example of results obtained by the display controlling unit 32 controlling the search results based on the popularity level stored as the evaluation information in the evaluation information storage unit 23. In FIG. 7, a literature with a higher popularity level is accompanied by a more detailed summary thereof (the number of letters or words, i.e., detailed degree, is increased).

That is, if the zoom-display state of the entire content or the objects is associated with the detailed degree of the entire content or the objects, the detailed degree is changed according to an evaluation value to control the zoom display of the entire content or the objects.

Specifically, if the zoom-display state of the entire content or the objects is associated with the detailed degree of the entire content or the objects, the detailed degree is increased when an evaluation value is higher, or the detailed degree is decreased when an evaluation value is higher.

Figure 8:
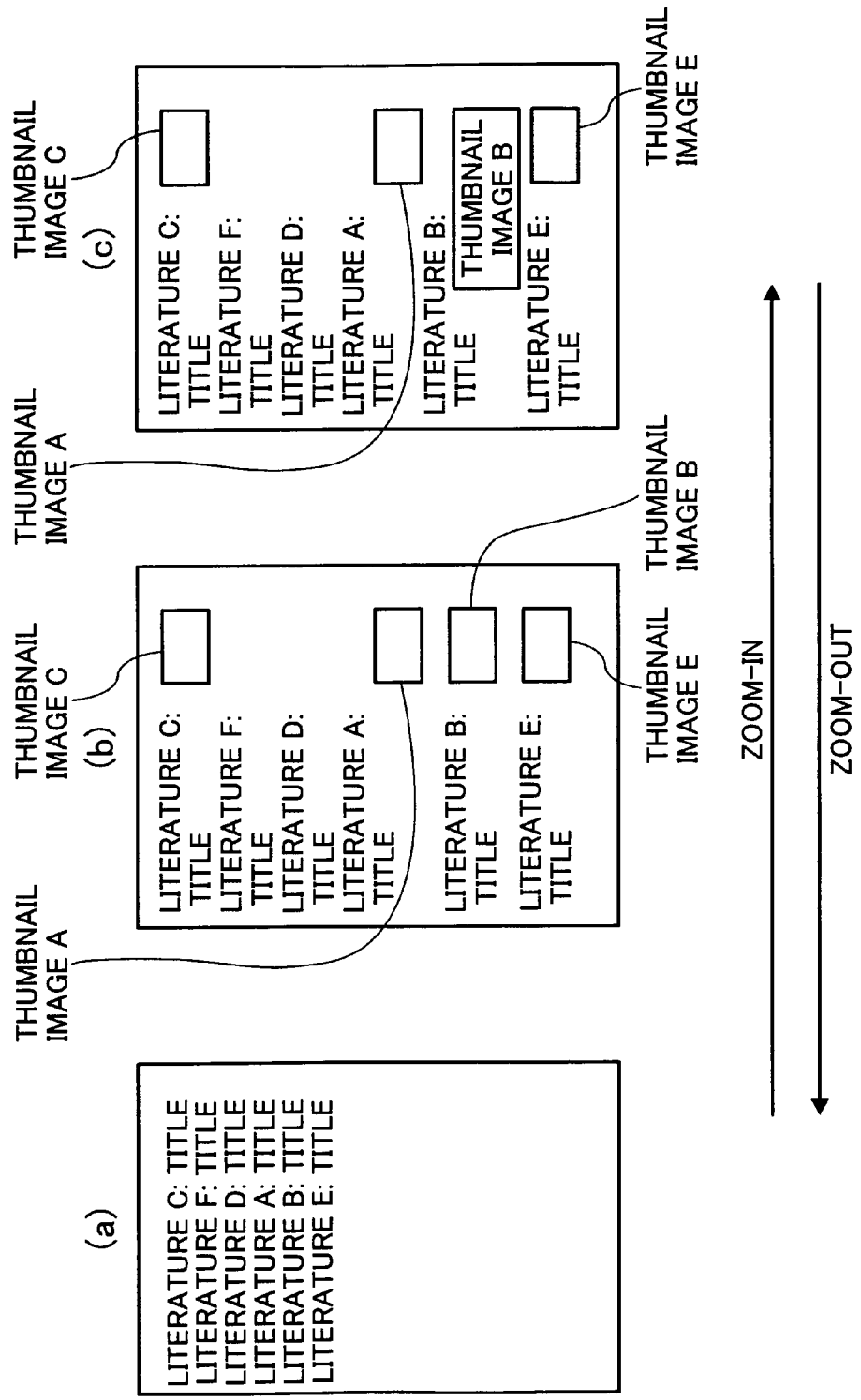

FIG. 8 is yet another example of results obtained by the display controlling unit 32 controlling the search results based on the popularity level stored as the evaluation information in the evaluation information storage unit 23. In FIG. 8, a literature with a higher popularity level is accompanied by a larger thumbnail image of the cover thereof.

Therefore, a user can comprehend not only the ranking score but also popularity on the same screen.

That is, if the zoom-display state of the entire content or the objects is associated with the size of an image included in the entire content or the objects, the image size is changed according to an evaluation value to control the zoom display of the entire content or the objects.

Specifically, if the zoom-display state of the entire content or the objects is associated with the size of an image included in the entire content or the objects, the image size is increased when an evaluation value is higher, or the image size is decreased when an evaluation value is higher.

The above examples can be combined. For example, when the evaluation value is higher, both the number of information items and the font size can be increased, or both the number of letters or words in a literature summary and the thumbnail image size can be increased.

As described above, according to the first embodiment, zoom display of the entire content or the objects selected as a zoom target can be controlled according to evaluation information related to the selected entire content or the objects. Thus, various pieces of the evaluation information can be checked from the zoom display of the entire content or the objects.

Next, a second embodiment of the present invention is explained with reference to FIGS. 9 to 11. The same reference characters are utilized in designating corresponding portions, and the same explanations are not repeated.

FIG. 9 is a search result screen based on the evaluation information stored in the evaluation information storage unit 23 shown in FIG. 4. The search result screen is different from that of the first embodiment in that the display is represented by a vertical axis and a horizontal axis as two-dimensional indices. The vertical axis represents the order based on the ranking score, and the horizontal axis represents the publication year of literatures. With this search result screen, the publication year can be visually and easily comprehended in addition to a degree of relevance between a search keyword and literature summary.

As shown in FIG. 9, a radio button B is located on the upper side of the two-dimensional search result screen. A user can select preferred one of the popularity level and the difficulty level as the evaluation information using the radio button B.

FIG. 10 is an example of results obtained by zoom-in/zoom-out operation for all search results. In (a) of FIG. 10, the search result screen displays, as the search results, only the literature names arranged in a matrix according to the ranking score and the literature publication year. If zooming (zoom-in operation) is performed for the entire list of the search results, the zooming is controlled based on an index selected by a user as the evaluation information. The evaluation information "popularity level" is used in FIG. 10, and therefore, if zooming (zoom-in operation) is performed for the entire list of the search results, a literature with a higher popularity level is displayed in a larger font size.

On the other hand, FIG. 11 is an example of results obtained by controlling the search results based on the difficulty level. In FIG. 11, a literature with a higher difficulty level is displayed in a larger font size.

As a result, evaluation values of the third index can be visually and easily comprehended in addition to the ranking score and the publication year.

The evaluation information can be selected not only by the radio button B but also by using other means such as a pull-down menu. The indices of the vertical and horizontal axes of the two-dimensional display screen are not limited as above mentioned, and other combinations can be used. For example, the vertical axis can represent the popularity level, and the ranking score and the difficulty level can be associated with the zoom control.

As described above, according to the second embodiment, if a plurality of pieces of evaluation information is related to the entire content or the objects, evaluation information to be associated with zoom display of the entire content or the objects can be selected with a radio button. Thus, a plurality of pieces of the evaluation information can be visually and easily comprehend.

As set forth hereinabove, according to an embodiment of the present invention, zoom display of the entire content or the objects selected as a zoom target can be controlled according to evaluation information related to the selected entire content or objects. Thus, various pieces of evaluation information can be checked from zoom display of the entire content or the objects.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A content browsing system that performs zoom operation for a content that includes an object or the object to change a display state of the content or the object, the content browsing system comprising:
a storage unit that stores therein a plurality of evaluation indices related to the content or the object, the plurality of evaluation indices including a ranking score, a popularity level, a difficulty level and a publication year; and
a display control unit that selectively controls the display state of the content or the object selected as a zoom target based on the plurality of evaluation indices; and
wherein contents or objects, including the content or the object, are displayed in an evaluation index area, the evaluation index area is a display area defined by at least one evaluation index selected from the plurality of evaluation indices.

2. The content browsing system according to claim 1, wherein the display state of the content or the object is associated with a plurality of information items related to the content or the object, and the display control unit controls number of information items displayed.

3. The content browsing system according to claim 1, wherein the display state of the content or the object is associated with a font size of text in the content or the object, and the display control unit controls the font size in which the text is displayed.

4. The content browsing system according to claim 1, wherein the display state of the content or the object is associated with a degree of detail of the content or the object, and the display control unit determines the degree of detail in which the content or the object is displayed.

5. The content browsing system according to claim 1, wherein the display state of the content or the object is associated with a size of an image in the content or the object, and the display control unit controls the size in which the image is displayed.

6. The content browsing system according to claim 1, further comprising a selecting unit that allows a user to select, from a plurality of evaluation values, a selected evaluation value for the display control unit.

7. A computer program product for performing zoom operation for a content that includes an object or the object to change a display state of the content or the object, the computer program product comprising a computer usable medium having computer readable program codes embodied in the medium that, when executed, cause a computer to execute:
storing a plurality of evaluation indices related to the content or the object, the plurality of evaluation indices including a ranking score, a popularity level, a difficulty level and a publication year;
controlling selectively the display state of the content or the object selected as a zoom target based on the plurality of evaluation indices; and
displaying contents or objects, including the content or the object, in an evaluation index area, the evaluation index area is a display area defined by at least one evaluation index selected from the plurality of evaluation indices.

8. The computer program product according to claim 7, further comprising associating the display state of the content or the object with number of information items related to the content or the object, wherein the controlling includes determining the number of information items displayed based on evaluation information.

9. The computer program product according to claim 7, further comprising associating the display state of the content or the object with a font size of text in the content or the object, wherein the controlling includes determining the font size in which the text is displayed based on evaluation information.

10. The computer program product according to claim 7, further comprising associating the display state of the content or the object with a degree of detail of the content or the object, wherein the controlling includes determining the degree of detail in which the content or the object is displayed based on evaluation information.

11. The computer program product according to claim 7, further comprising associating the display state of the content or the object with a size of an image in the content or the object, wherein the controlling includes determining the size in which the image is displayed based on evaluation information.

12. The computer program product according to claim 7, further comprising selecting, from a plurality of evaluation values, a selected evaluation value for controlling the display state of the content or the object.

13. A content browsing method for performing zoom operation for a content that includes an object or the object to change a display state of the content or the object, content browsing method comprising:
   storing a plurality of evaluation indices related to the content or the object, the plurality of evaluation indices including a ranking score, a popularity level, a difficulty level and a publication year;
   controlling selectively the display state of the content or the object selected as a zoom target based on the plurality of evaluation indices; and
   displaying contents or objects, including the content or the object, in an evaluation index area, the evaluation index area is a display area defined by at least one evaluation index selected from the plurality of evaluation indices.

14. The content browsing method according to claim 13, further comprising associating the display state of the content or the object with number of information items related to the content or the object, wherein the controlling includes determining the number of information items displayed based on evaluation information.

15. The content browsing method according to claim 13, further comprising associating the display state of the content or the object with a font size of text in the content or the object, wherein the controlling includes determining the font size in which the text is displayed based on evaluation information.

16. The content browsing method according to claim 13, further comprising associating the display state of the content or the object with a degree of detail of the content or the object, wherein the controlling includes determining the degree of detail in which the content or the object is displayed based on evaluation information.

17. The content browsing method according to claim 13, further comprising associating the display state of the content or the object with a size of an image in the content or the object, wherein the controlling includes determining the size in which the image is displayed based on evaluation information.

18. The content browsing method according to claim 13, further comprising selecting, from a plurality of evaluation values, a selected evaluation value for controlling the display state of the content or the object.

* * * * *